US010684012B2

(12) United States Patent
Harger et al.

(10) Patent No.: US 10,684,012 B2
(45) Date of Patent: *Jun. 16, 2020

(54) PORTABLE IGNITION CONTROLLER

(71) Applicant: Harger, Inc., Grayslake, IL (US)

(72) Inventors: Mark S. Harger, Bristol, WI (US);
William Steve Marcomb, Antioch, IL (US)

(73) Assignee: HARGER, INC., Grayslake, IL (US)

( * ) Notice: Subject to any disclaimer, the term of this patent is extended or adjusted under 35 U.S.C. 154(b) by 508 days.

This patent is subject to a terminal disclaimer.

(21) Appl. No.: 15/389,110

(22) Filed: Dec. 22, 2016

(65) Prior Publication Data

US 2017/0102146 A1   Apr. 13, 2017

Related U.S. Application Data

(63) Continuation of application No. 14/170,209, filed on Jan. 31, 2014, now Pat. No. 9,562,751.

(51) Int. Cl.
| *F23Q 7/00* | (2006.01) |
| *F23Q 7/16* | (2006.01) |
| *F42B 3/10* | (2006.01) |
| *F24V 30/00* | (2018.01) |
| *H02J 7/00* | (2006.01) |

(52) U.S. Cl.
CPC .............. *F23Q 7/16* (2013.01); *F24V 30/00* (2018.05); *F42B 3/10* (2013.01); *H02J 7/0057* (2013.01)

(58) Field of Classification Search
CPC .................................. F23Q 3/006; F42B 3/10
USPC ........................................................ 361/264
See application file for complete search history.

(56) References Cited

U.S. PATENT DOCUMENTS

| 4,062,485 A | 12/1977 | Andersen |
| 4,131,413 A | 12/1978 | Ryno |
| 4,889,324 A | 12/1989 | Brosnan et al. |
| 5,145,106 A | 9/1992 | Moore et al. |
| 5,660,317 A | 8/1997 | Singer et al. |
| 5,975,888 A | 11/1999 | Hsu |

(Continued)

FOREIGN PATENT DOCUMENTS

| EP | 875330 | 11/1998 |
| EP | 1472037 | 1/2009 |

(Continued)

OTHER PUBLICATIONS

United States Patent Office Action for U.S. Appl. No. 14/170,209 dated Apr. 22, 2016 (7 pages).

(Continued)

*Primary Examiner* — Thienvu V Tran
*Assistant Examiner* — Lucy M Thomas
(74) *Attorney, Agent, or Firm* — Michael Best & Friedrich LLP

(57) ABSTRACT

A portable exothermic welding ignition controller includes a housing configured to receive a first portion of a portable power tool battery with a second portion of the portable tool battery external to the housing. A circuit board is positioned within the housing and configured for electrical coupling to the portable power tool battery. An actuator is operatively engageable with the circuit board for selectively discharging power from the portable power tool battery to a connection terminal electrically coupled to the circuit board.

6 Claims, 4 Drawing Sheets

(56) References Cited

U.S. PATENT DOCUMENTS

| | | | |
|---|---|---|---|
| 6,575,735 B1 | 6/2003 | Lloveras Capilla | |
| 6,789,724 B2 | 9/2004 | Cordier et al. | |
| 6,793,003 B2 | 9/2004 | Triantopoulos et al. | |
| 6,994,244 B2 | 2/2006 | Harger et al. | |
| 7,240,717 B2 | 7/2007 | Lofton | |
| D623,126 S | 9/2010 | Contreras | |
| 7,946,466 B1 | 5/2011 | Lofton | |
| 7,950,568 B2 | 5/2011 | Stidham et al. | |
| 7,975,900 B2 | 7/2011 | Lofton et al. | |
| 8,074,864 B2 | 12/2011 | Lofton et al. | |
| 8,292,457 B2 * | 10/2012 | Schenk | F21S 8/02 362/217.11 |
| 9,115,890 B2 | 8/2015 | Zagoroff | |
| 2003/0022120 A1 * | 1/2003 | Liang | F23Q 2/164 431/255 |
| 2008/0251559 A1 | 10/2008 | Uejima et al. | |
| 2009/0188969 A1 | 7/2009 | Siracki et al. | |
| 2010/0163607 A1 | 7/2010 | Viseur et al. | |
| 2011/0132967 A1 | 6/2011 | Lofton et al. | |
| 2011/0198391 A1 | 8/2011 | Stidham et al. | |
| 2012/0055979 A1 | 3/2012 | Alghusain | |
| 2015/0328716 A1 | 11/2015 | Duart Alvarez Cienfuegos | |

FOREIGN PATENT DOCUMENTS

| | | |
|---|---|---|
| WO | 2007014191 | 2/2007 |
| WO | 2011071561 | 6/2011 |

OTHER PUBLICATIONS

United States Patent Office Notice of Allowance for U.S. Appl. No. 14/170,209 dated Sep. 27, 2016 (7 pages).

* cited by examiner

PORTABLE IGNITION CONTROLLER

CROSS-REFERENCE TO RELATED APPLICATIONS

This application is a continuation of U.S. patent application Ser. No. 14/170,209, filed Jan. 31, 2014, the contents of which are incorporated herein by reference.

BACKGROUND

The present invention relates to an ignition controller, and more specifically to an exothermic welding ignition controller.

SUMMARY

In one embodiment, a portable exothermic welding ignition controller includes a housing configured to receive a portion of a portable power tool battery. A circuit board is positioned within the housing and configured for electrical coupling to the portable power tool battery. An actuator is operatively engageable with the circuit board for selectively discharging power from the portable power tool battery to a connection terminal electrically coupled to the circuit board.

In one embodiment, a method for discharging power from a portable power tool battery to an exothermic welding device includes electrically coupling the portable power tool battery to a circuit board operatively engaged with an actuator. The method also includes connecting the exothermic welding device to a terminal electrically coupled to the circuit board. The method further includes actuating the actuator to establish electrical communication between the portable power tool battery and the terminal, whereby power is discharged from the portable power tool battery to the exothermic welding device.

In one embodiment, a method for discharging power from a portable power tool battery to a filament of an exothermic welding igniter includes electrically coupling the portable power tool battery to a circuit board operatively engaged with a manual actuator in the form of a plurality of push-buttons. The method also includes connecting the igniter through a conducting wire to a terminal electrically coupled to the circuit board. The method further includes actuating the actuator to establish electrical communication between the portable power tool battery and the igniter, whereby power is discharged from the portable power tool battery to the igniter to heat the filament.

In one embodiment, a portable exothermic welding ignition controller includes a housing configured for electrical connection to a portable power tool battery. An external structure of the portable power tool battery is configured to support the housing. A circuit board is positioned within the housing and configured for electrical coupling to the portable power tool battery. An actuator is operatively engageable with the circuit board for selectively discharging power from the portable power tool battery to a connection terminal electrically coupled to the circuit board.

In one embodiment, a portable exothermic welding ignition controller includes a housing configured to receive a first portion of a portable power tool battery with a second portion of the portable tool battery external to the housing. A circuit board is positioned within the housing and configured for electrical coupling to the portable power tool battery. An actuator is operatively engageable with the circuit board for selectively discharging power from the portable power tool battery to a connection terminal electrically coupled to the circuit board In one embodiment, a portable exothermic welding ignition controller includes a housing configured to receive a portion of a portable power tool battery with a portion of the portable tool battery external to and configured to be supported on an exterior surface of the housing. A circuit board is positioned within the housing and configured for electrical coupling to the portable power tool battery. An actuator is operatively engageable with the circuit board for selectively discharging power from the portable power tool battery to a connection terminal electrically coupled to the circuit board Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

The process of exothermic welding involves placing an amount of copper oxide powder into a mold base, securing the mold, and then igniting the copper oxide powder. The ignited powder is heated to a liquid state and drops into a lower chamber, forming an electrical connection around two adjacent grounding conductors as it cools. An ignition controller can be used to effect a voltage between a set of terminals in electrical communication with a filament positioned in physical contact with the copper oxide powder sufficient to heat the filament and ignite the powder.

Figure 1:
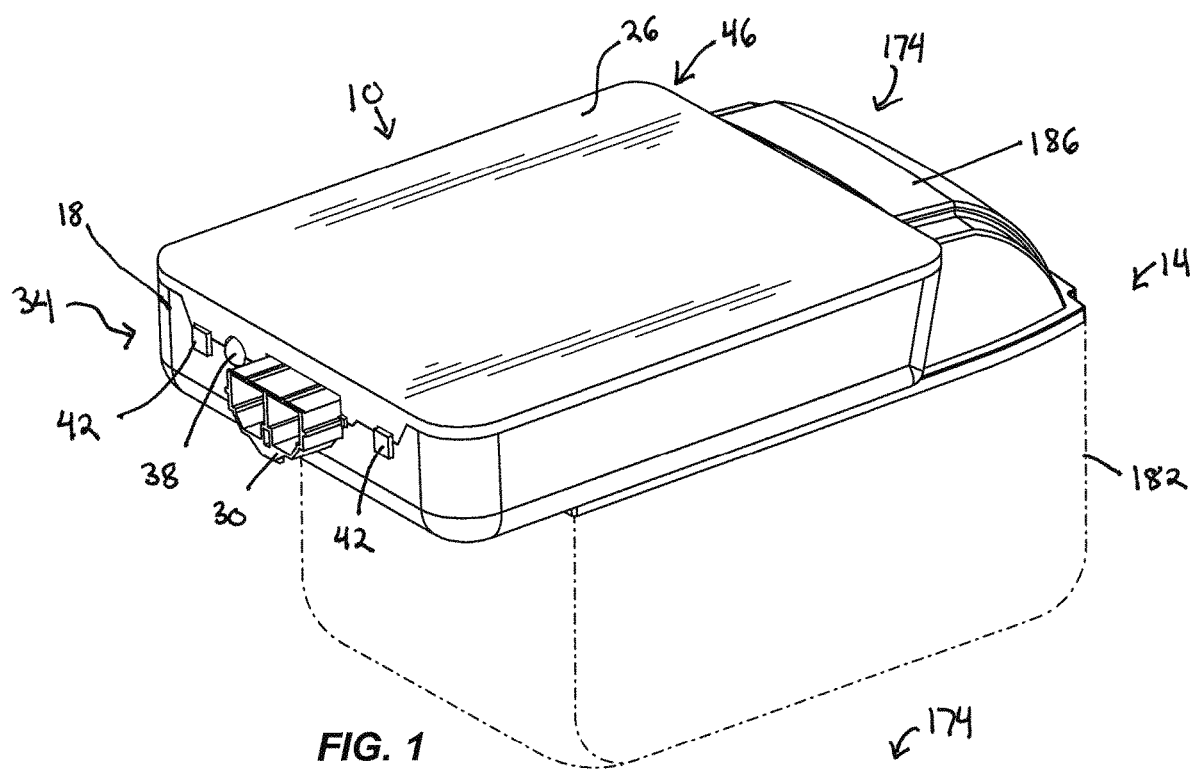
FIG. 1 is a perspective view of an ignition controller connected to a rechargeable battery pack.
Figure 2:
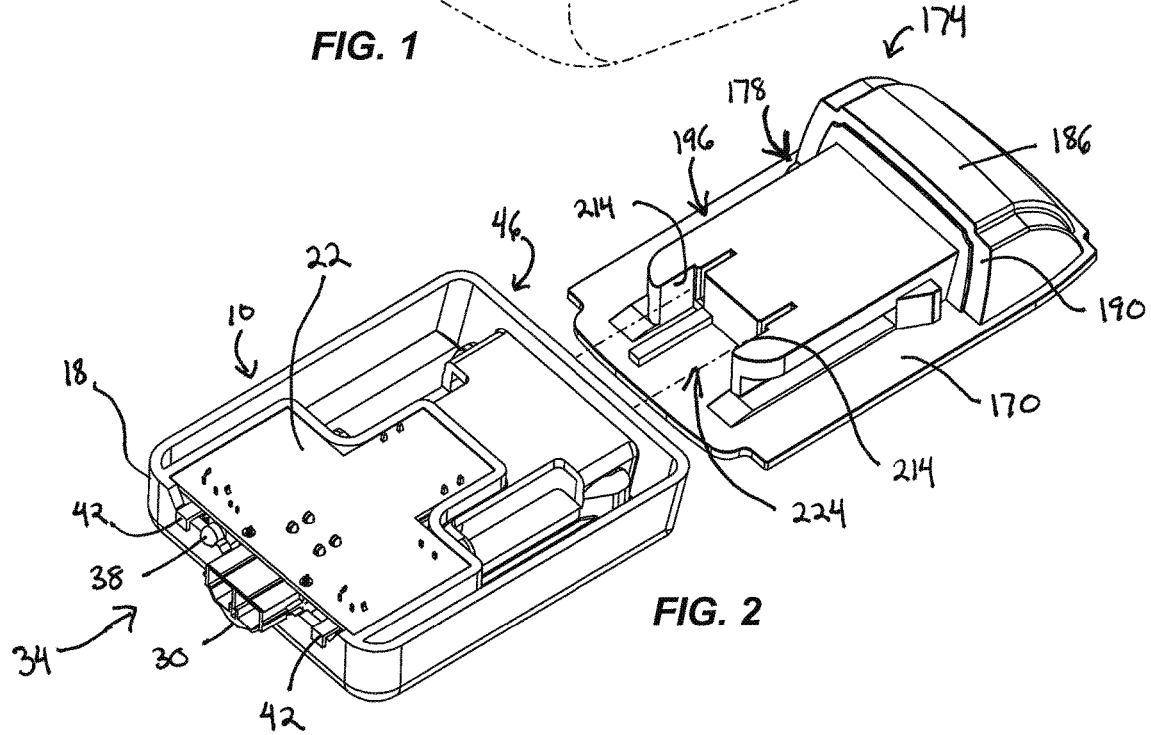
FIG. 2 is a perspective view of the ignition controller of FIG. 1 with a top cover removed and separated from the battery pack.

FIG. 1 illustrates an ignition controller 10 coupled to a battery pack 14. Referring also to FIG. 2, the ignition controller 10 includes a housing 18 containing a circuit board 22 onto which are connected certain electronic and electrical devices, for example, an electronic or electromechanical switch (not shown), coupled with other circuitry necessary for operation, as will be further described. A cover 26 protects the circuit board 22 from the surrounding environment. A seal, gasket, or other similar material (not shown) can be positioned between the cover 26 and the housing 18 to form a water-tight barrier therebetween. A connector 30 coupled to the circuit board 22 protrudes through an aperture formed between the housing 18 and the cover 26 on a first side 34 of the controller 10. The connector 30 can be a conventional male/female electrical connector. An LED (light-emitting diode) or other visual indicator 38 also coupled to the circuit board 22 extends from the first side 34, as do first and second actuators 42. The actuators 42 are in the form of pushbuttons operatively engageable with the aforementioned switch on the circuit board 22 but can alternatively be in any form sufficient to activate a switch or otherwise complete an electrical circuit.

Figure 3:
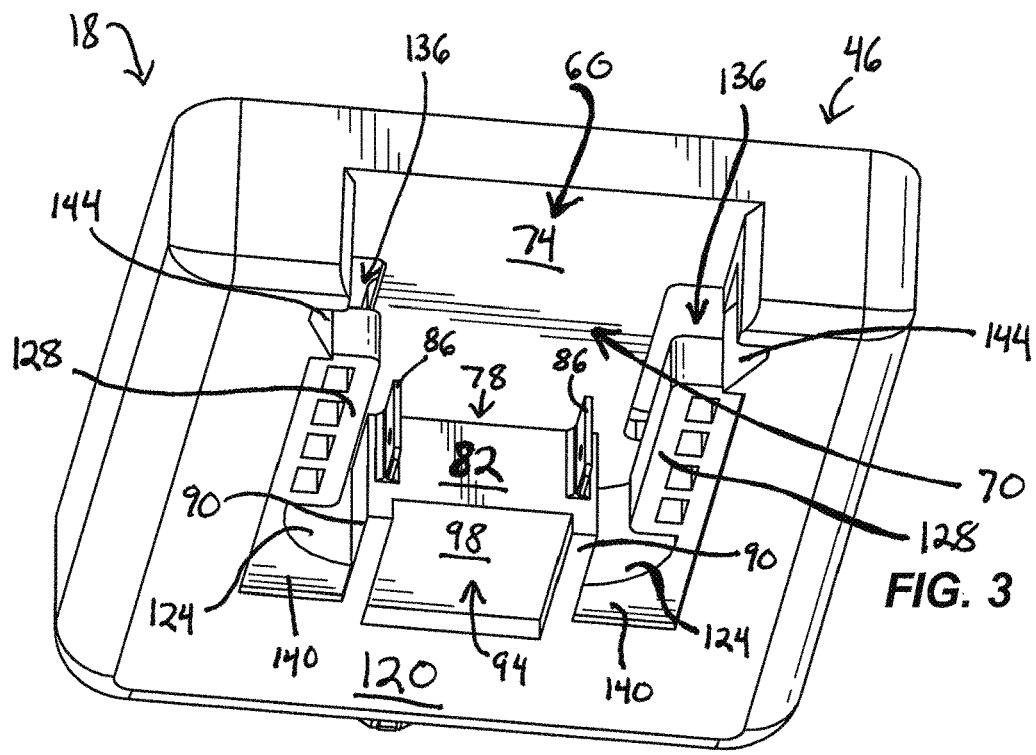
FIG. 3 is a perspective view of the opposing side of the ignition controller illustrated in FIG. 2.
Figure 4:
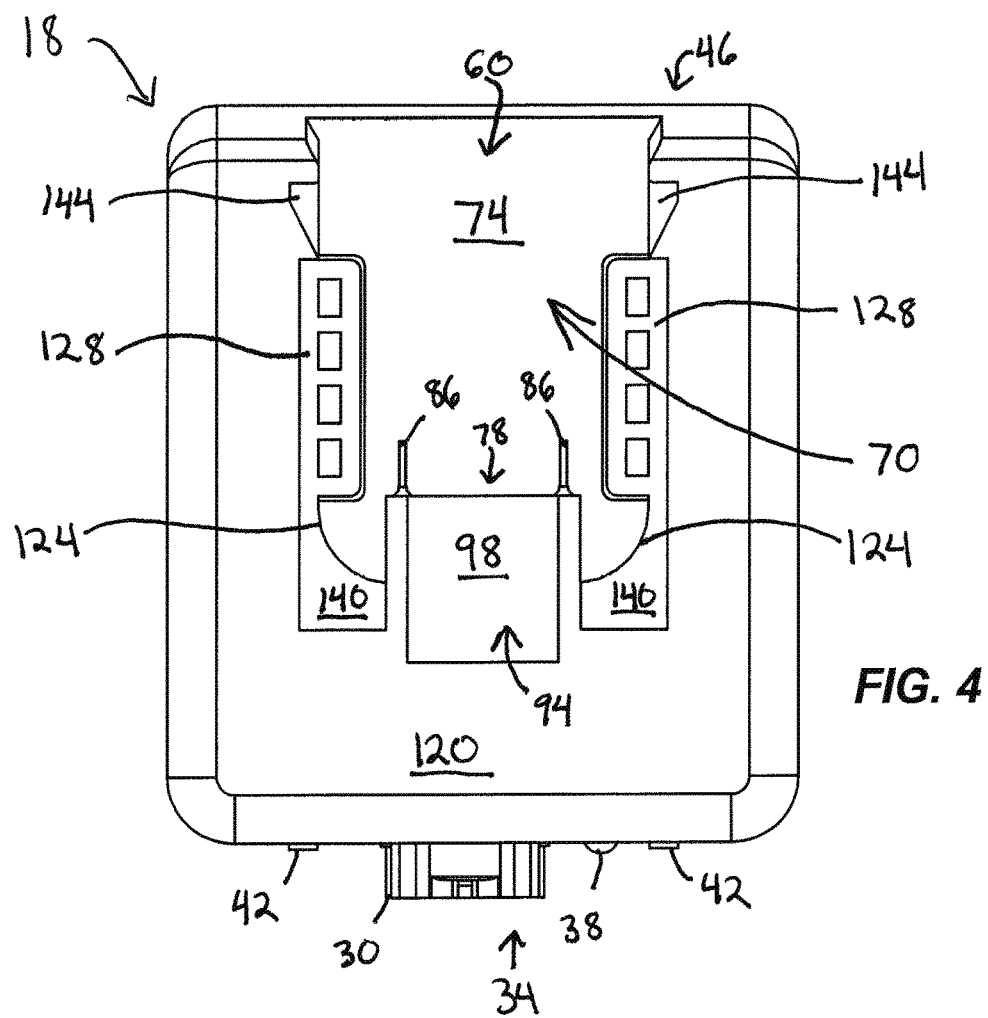
FIG. 4 is a plan view of the ignition controller illustrated in FIG. 3.

FIGS. 3 and 4 illustrate the coupling structure of the housing 18. An opening 60 on a second side 46 of the controller 10 leads to a recess 70 formed in the housing 18 for receiving a portion of the battery pack 14. The recess 70 is at least partially defined by a generally planar surface 74 and a connector block 78 having a contact surface 82, a pair of electrical prongs 86, and opposing side walls 90. A slight depression 94 in the connector block 78 forms a surface 98 offset from the external housing surface 120. Each side wall 90 transitions via an arcuate end wall 124 to a projection 128. The projections 128 partially define receiving cavities 136 with the planar surface 74. As best shown in FIG. 3, the projections 128 and arcuate end walls 124 are also offset from the housing surface 120 and present depressed surfaces 140 substantially flush with the surface 98. Catches 144, in the form of angled lateral recesses, are laterally positioned near the opening 60.

Referring again to FIGS. 1 and 2, the battery pack 14 is a rechargeable battery typically used with portable power tools (e.g., a portable electric drill) and includes a plate 170 separating a connecting portion 174 containing a battery coupling structure 178 from a cell portion 182 containing the battery cells. The battery can be a lithium-ion battery with a DC voltage output range from approximately 18 to 28 volts with 3.0-5.0 amp-hours of run time. As an example of the type of battery that can be used with this system, the battery pack 14 may be a Milwaukee M18™ REDLITHIUM™ compact battery such as a M18™ REDLITHIUM™ XC 4.0 18 volt lithium-ion battery. In other embodiments, other rechargeable power tool battery packs may be suitable to provide the required power for the application.

The cell portion 182 is best illustrated in FIG. 1 by means of phantom lines to account for differing battery brands or types. For illustrative purposes, the remaining figures of the battery pack 14 only display the connecting portion 174.

Figure 5:
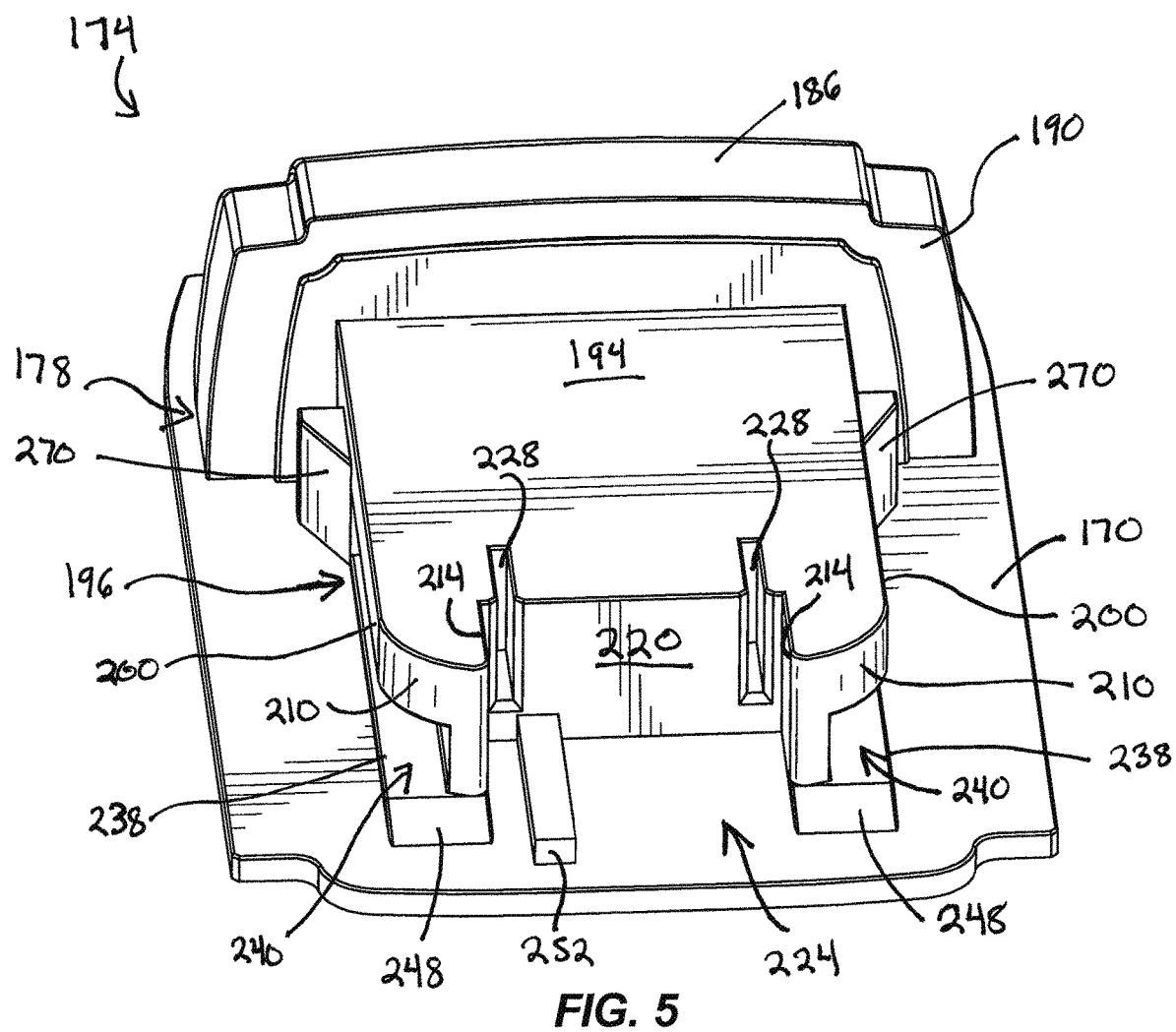
FIG. 5 is a perspective view of the battery pack illustrated in FIG. 2.

With reference to FIGS. 2 and 5, the battery coupling structure 178 includes an end portion 186 housing a release mechanism. Two side release levers (not shown) laterally extend from the end portion 186 and are coupled to the release mechanism. In other embodiments with other battery packs, the release mechanism may be differently positioned. A travel stop 190 integral with the end portion 186 adjoins a top surface 194 of a mating block 196. The mating block 196 extends across a substantial portion of the plate 170 and features first and second shoulders 200, each configured with a curved external surface 210 and a generally flat internal surface 214. The internal surfaces 214, together with a contact face 220 and the plate 170 serve to define a receiving pocket 224. Receptacles 228 are positioned into the face 220 and are electrically connected to the battery cells within the cell portion 182. Steps 238 on the plate 170 and the shoulders 200 together form opposing side receiving cavities 240. At one end of each cavity 240 ramps 248 smoothly connect the plate 170 and the steps 238. An inner guide 252 is further positioned between the surfaces 214 on the plate 170. Near the travel stop 190, spring loaded angled locking wedges 270 are biased outward and away from the block 196.

Figure 6:
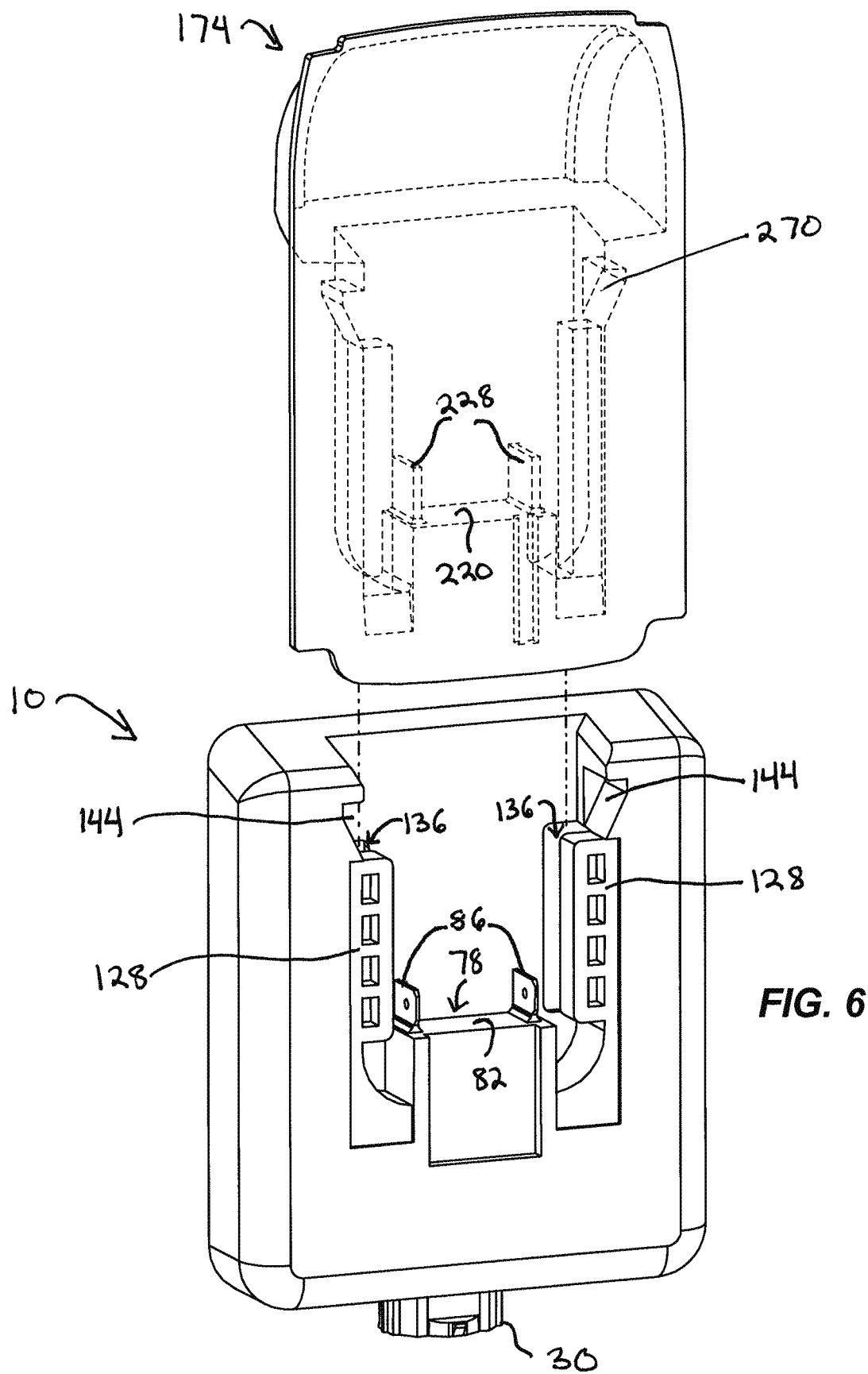
FIG. 6 is another perspective view of the ignition controller and battery pack illustrated in FIG. 2.

To assemble the battery pack 14 to the ignition controller 10, a user guides connecting portion 174 of the battery pack 14 so that the mating block 196 is aligned with the opening 60. FIG. 6 illustrates the path that the battery pack 14 follows in order to mate with the controller 10. After the mating block 196 is initially received in the recess 70, the user continues to slide battery pack 14 into engagement with the ignition controller 10. The ramps 248 of the battery pack 14 contact the projections 128 of the ignition controller 10 and direct the projections 128 into the side receiving cavities 240 of the battery pack 14. Concurrently, the shoulders 200 of the battery pack 14 enter the receiving cavities 136 of the ignition controller 10. Continued sliding of the battery pack 14 engages the inner guide 252 with the surface 98 of the connector block 78. The electrical prongs 86 mate with the receptacles 228 to electrically couple the ignition controller 10 with the battery pack 14 as the curved portions 210 of the shoulders 200 contact the arcuate walls 124 of the ignition controller 10 and the face 220 of the battery pack 14 abuts the contact surface 82. The angled locking wedges 270, which are initially depressed into the block 196, release into the catches 144 upon full engagement of the controller 10 and the battery pack 14. The travel stop 190, along with one or more of the previously described surfaces of both components, precludes further approach by the battery pack 14.

When the battery pack 14 is fully received by the ignition controller 10, contact between the angled locking wedges 270 and the catches 144, as well as between the projections 128 and the shoulders 200, securely holds the battery pack 14 and the ignition controller 10 together and hinders any movement tending to separate the two.

In operation, once the ignition controller 10 and the battery pack 14 are properly coupled, power from the battery pack 14 is now transferrable through the circuit board 22 and to the connector 30. Either before or after coupling of the controller 10 to the battery pack 14, an exothermic welding igniter (not shown) is coupled to the connector 30. The igniter includes an igniter tip with a filament and a pair of electrical conductors. Conducting or lead wires (not shown) are secured at one end to the electrical conductors and at the other end to the connector 30. With the controller 10 now electrically coupled to the igniter, a user simultaneously depresses the pushbuttons 42, the movement of which activates the switch on the circuit board 22 to complete the electrical circuit. Completion of the circuit activates the LED indicator 38, and power flows from the battery pack 14 to the connector 30 and through the lead wires to the igniter. The current discharged heats the filament and drives the exothermic welding process as previously described. If only a single pushbutton 42 is depressed, the circuit remains open and the LED indicator 38 will not light. In other embodiments, the LED indicator 38 can be configured to light when the battery pack 14 is coupled to the housing 18 or when a device is coupled to the connector 30.

After the exothermic welding is completed, the igniter is disconnected from the connector 30, and the battery pack 14 is removed from the ignition controller 10. To remove the battery pack 14 from the ignition controller 10, the user depresses the two side release levers of the battery pack 14. The angled locking wedges 270 recede into the mating block 196, permitting the user to slide the mating block 196 out of the recess 70 and the battery pack 14 away from the controller 10, whereby the battery pack 14 is available for other uses.

The controller 10 provides, among other things, a portable ignition welding apparatus that mates with a readily available portable rechargeable battery used with portable power tools to supply suitable power for heating an exothermic welding igniter. The ignition controller 10 is not limited in its use to exothermic welding, but can be used as a power controller for a variety of applications. Various features and advantages of the invention are set forth in the following claims.

What is claimed is:

1. A portable exothermic welding ignition controller comprising:
   a housing including a recess formed therein, the recess open on two sides of the housing and configured to receive a portion of a portable power tool battery with a portion of the portable power tool battery external to the housing;
   a circuit board positioned within the housing;
   a pair of electrical prongs disposed in the recess, the pair of electrical prongs configured to electrically couple the circuit board to the portable power tool battery; and
   an actuator operatively engageable with the circuit board for selectively discharging power from the portable power tool battery,
   wherein the recess is at least partially defined by a planar surface, a connector block extending from the planar surface and having a contact surface positioned opposite a first open side of the two open sides and perpendicular to a second open side of the two open sides, the pair of electrical prongs extending from the contact surface into the recess toward the first open side, and a pair of opposed side walls oriented perpendicular to the planar surface and the contact surface.

2. The portable exothermic welding ignition controller of claim 1, wherein each of the pair of opposed side walls forms a projection that defines with the planar surface a receiving cavity therebetween.

3. The portable exothermic welding ignition controller of claim 2, wherein an exterior surface of the portable power tool battery includes a mating block that defines a pocket configured to receive the pair of electrical prongs.

4. The portable exothermic welding ignition controller of claim 3, wherein the mating block is at least partially defined by a top surface having first and second opposed longitudinal sides and first and second shoulders with the first shoulder extending from and oriented perpendicular to the first longitudinal side and the second shoulder extending from and oriented perpendicular to the second longitudinal side, wherein the pocket is open on two sides and at least partially defined by a pair of spaced-apart parallel internal surfaces, a contact face positioned between and perpendicular to the pair of spaced-apart parallel internal surfaces and the housing, and wherein a pair of receptacles are positioned in the contact face to receive the pair of electrical prongs.

5. The portable exothermic welding ignition controller of claim 2, wherein the mating block defines with an exterior surface of the portable power tool battery a pair of mating block receiving cavities therebetween.

6. The portable exothermic welding ignition controller of claim 5, wherein each mating block receiving cavity of the pair of mating block receiving cavities is formed by a mating block shoulder with the exterior surface of the portable power tool battery.

* * * * *